United States Patent [19]

Becerra et al.

[11] Patent Number: 5,675,231

[45] Date of Patent: Oct. 7, 1997

[54] SYSTEMS AND METHODS FOR PROTECTING A SINGLE PHASE MOTOR FROM CIRCULATING CURRENTS

[75] Inventors: Roger C. Becerra; Mark A. Brattoli, both of Fort Wayne, Ind.

[73] Assignee: General Electric Company, Fort Wayne, Ind.

[21] Appl. No.: 647,694

[22] Filed: May 15, 1996

[51] Int. Cl.$^6$ .................................................. H02P 5/40
[52] U.S. Cl. ....................... 318/801; 318/138; 318/254; 62/228.4; 62/215
[58] Field of Search ........................... 318/138, 254, 318/790–832; 388/907, 907.5, 908, 801, 804, 805, 808; 62/228.1, 228.5, 215, 228.4

[56] References Cited

U.S. PATENT DOCUMENTS

| | | | |
|---|---|---|---|
| 3,048,006 | 8/1962 | Goodman. | |
| 3,134,385 | 5/1964 | Cushing | 134/58 |
| 3,137,125 | 6/1964 | Kyryluk. | |
| 3,936,652 | 2/1976 | Levine. | |
| 3,955,130 | 5/1976 | Graf | 318/332 |
| 4,015,182 | 3/1977 | Erdman | 318/334 |
| 4,018,543 | 4/1977 | Carson et al.. | |
| 4,047,083 | 9/1977 | Plunkett | 318/231 |

(List continued on next page.)

FOREIGN PATENT DOCUMENTS

| | | |
|---|---|---|
| B-8993991 | 6/1992 | Australia. |
| 87/03433 | 4/1987 | WIPO. |

OTHER PUBLICATIONS

Soviet Patent Abstracts; S–X Sections; Week 8945; Dec. 20, 1989.

Thomas M. Jahns et al., "Integrated Current Regulation for a Brushless ECM Drive," Jan. 1991, IEEE Transactions On Power Electronics, vol. 6, No. 1, pp. 118–126.

Primary Examiner—Paul Ip
Attorney, Agent, or Firm—Ralph E. Krisher, Jr.

[57] ABSTRACT

A single phase motor system and method for preventing excessive circulating currents in the motor. The motor has a power supply link including power switches responsive to a motor control signal for connecting the motor winding to a power supply in alternating on and off intervals. A current sensing circuit senses current in the power supply link during the on intervals. A current regulation circuit generates a current regulation signal representative of the difference between the sensed current and a peak regulated current level that is a function of desired motor speed and/or torque. An overcurrent circuit generates an overcurrent signal in response to the sensed current exceeding a maximum current level greater than the peak regulated current level. The motor also has a control circuit responsive to the current regulation signal for generating the motor control signal thereby to regulate current in the winding and control the motor speed and/or torque. At least one of the on intervals is greater than or equal to a minimum interval which is independent of the current regulation signal. The control circuit is also responsive to the overcurrent signal for causing the power switches to disconnect the winding from the power supply thereby to prevent excessive currents from circulating in the motor.

22 Claims, 6 Drawing Sheets

U.S. PATENT DOCUMENTS

| | | | |
|---|---|---|---|
| 4,118,636 | 10/1978 | Christian . | |
| 4,167,693 | 9/1979 | Liska et al. | 318/138 |
| 4,224,528 | 9/1980 | Argo . | |
| 4,250,435 | 2/1981 | Alley et al. | 318/138 |
| 4,250,544 | 2/1981 | Alley | 364/110 |
| 4,275,309 | 6/1981 | Lucier . | |
| 4,291,265 | 9/1981 | Kawada et al. | 318/782 |
| 4,313,076 | 1/1982 | Rathje | 318/790 |
| 4,314,191 | 2/1982 | Kawada et al. | 318/802 |
| 4,346,434 | 8/1982 | Morinaga | 364/183 |
| 4,359,870 | 11/1982 | Holton . | |
| 4,390,826 | 6/1983 | Erdman et al. | 318/439 |
| 4,415,844 | 11/1983 | Mendenhall et al. | 318/254 |
| 4,418,308 | 11/1983 | Bose | 318/803 |
| 4,433,544 | 2/1984 | Wells et al. . | |
| 4,452,046 | 6/1984 | Valentin . | |
| 4,459,519 | 7/1984 | Erdman | 318/254 |
| 4,477,762 | 10/1984 | Kurakake et al. | 318/802 |
| 4,495,450 | 1/1985 | Tokizaki et al. | 318/138 |
| 4,500,821 | 2/1985 | Bitting et al. | 318/254 |
| 4,520,296 | 5/1985 | Lepper et al. | 318/254 |
| 4,528,486 | 7/1985 | Flaig et al. | 318/254 |
| 4,540,921 | 9/1985 | Boyd, Jr. et al. | 318/254 |
| 4,558,264 | 12/1985 | Weischedel | 318/254 |
| 4,578,623 | 3/1986 | Tsukutani et al. | 318/254 |
| 4,595,865 | 6/1986 | Johns | 318/254 |
| 4,626,755 | 12/1986 | Butcher et al. | 318/473 |
| 4,635,349 | 1/1987 | Rabe | 29/596 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,649,331 | 3/1987 | Johns | 318/798 |
| 4,653,285 | 3/1987 | Pohl | 62/126 |
| 4,654,566 | 3/1987 | Erdman | 318/254 |
| 4,667,480 | 5/1987 | Bessler | 62/180 |
| 4,669,040 | 5/1987 | Pettit et al. | 318/610 X |
| 4,669,405 | 6/1987 | Resta et al. | 112/121.14 |
| 4,678,973 | 7/1987 | Elliott et al. | 318/254 |
| 4,688,547 | 8/1987 | Ballard et al. | 126/116 A |
| 4,712,050 | 12/1987 | Nagasawa et al. | 318/254 |
| 4,722,018 | 1/1988 | Pohl | 361/22 |
| 4,724,678 | 2/1988 | Pohl | 62/80 |
| 4,736,143 | 4/1988 | Nakamura et al. | 318/432 |
| 4,743,815 | 5/1988 | Gee et al. | 318/254 |
| 4,752,724 | 6/1988 | Radziwill et al. | 318/254 |
| 4,754,405 | 6/1988 | Foster | 364/557 |
| 4,757,241 | 7/1988 | Young | 318/254 |
| 4,757,603 | 7/1988 | Stokes | 29/598 |
| 4,763,347 | 8/1988 | Erdman | 318/254 |
| 4,806,839 | 2/1989 | Nagato et al. | 318/798 |
| 4,860,231 | 8/1989 | Ballard et al. | 364/571 |
| 4,868,467 | 9/1989 | Davis | 318/254 |
| 4,876,491 | 10/1989 | Squires et al. | 318/138 |
| 4,879,502 | 11/1989 | Endo et al. | 318/723 |
| 4,896,089 | 1/1990 | Kliman et al. | 318/701 |
| 4,902,952 | 2/1990 | Lavery | 318/645 |
| 4,950,918 | 8/1990 | O'Breartuin et al. | 307/242 |
| 4,952,853 | 8/1990 | Archer | 318/254 |
| 4,958,269 | 9/1990 | Gritter | 364/153 |
| 4,959,596 | 9/1990 | MacMinn et al. | 318/254 |
| 4,992,715 | 2/1991 | Nakamura et al. | 318/649 |
| 5,045,988 | 9/1991 | Gritter et al. | 363/35 |
| 5,107,685 | 4/1992 | Kobayaski | 62/115 |
| 5,119,071 | 6/1992 | Takezawa et al. | 318/130 |
| 5,140,243 | 8/1992 | Lyons et al. | 318/701 |
| 5,170,344 | 12/1992 | Berton et al. | 364/400 |
| 5,172,036 | 12/1992 | Cameron | 318/138 |
| 5,202,951 | 4/1993 | Doyle | 388/811 |
| 5,221,881 | 6/1993 | Cameron | 318/254 |
| 5,233,275 | 8/1993 | Danino | 318/254 |
| 5,254,926 | 10/1993 | Miller et al. | 318/798 |
| 5,259,211 | 11/1993 | Ikeda | 62/228.4 |
| 5,282,723 | 2/1994 | Bellomo | 417/45 |
| 5,285,029 | 2/1994 | Araki | 187/114 |
| 5,287,045 | 2/1994 | Uehara | 318/268 |
| 5,306,988 | 4/1994 | Carobolante et al. | 318/254 |
| 5,423,192 | 6/1995 | Young et al. | 62/228 |
| 5,465,019 | 11/1995 | Kliman | 310/156 |
| 5,483,139 | 1/1996 | Welles, II | 318/782 |
| 5,552,685 | 9/1996 | Young et al. | 318/254 |

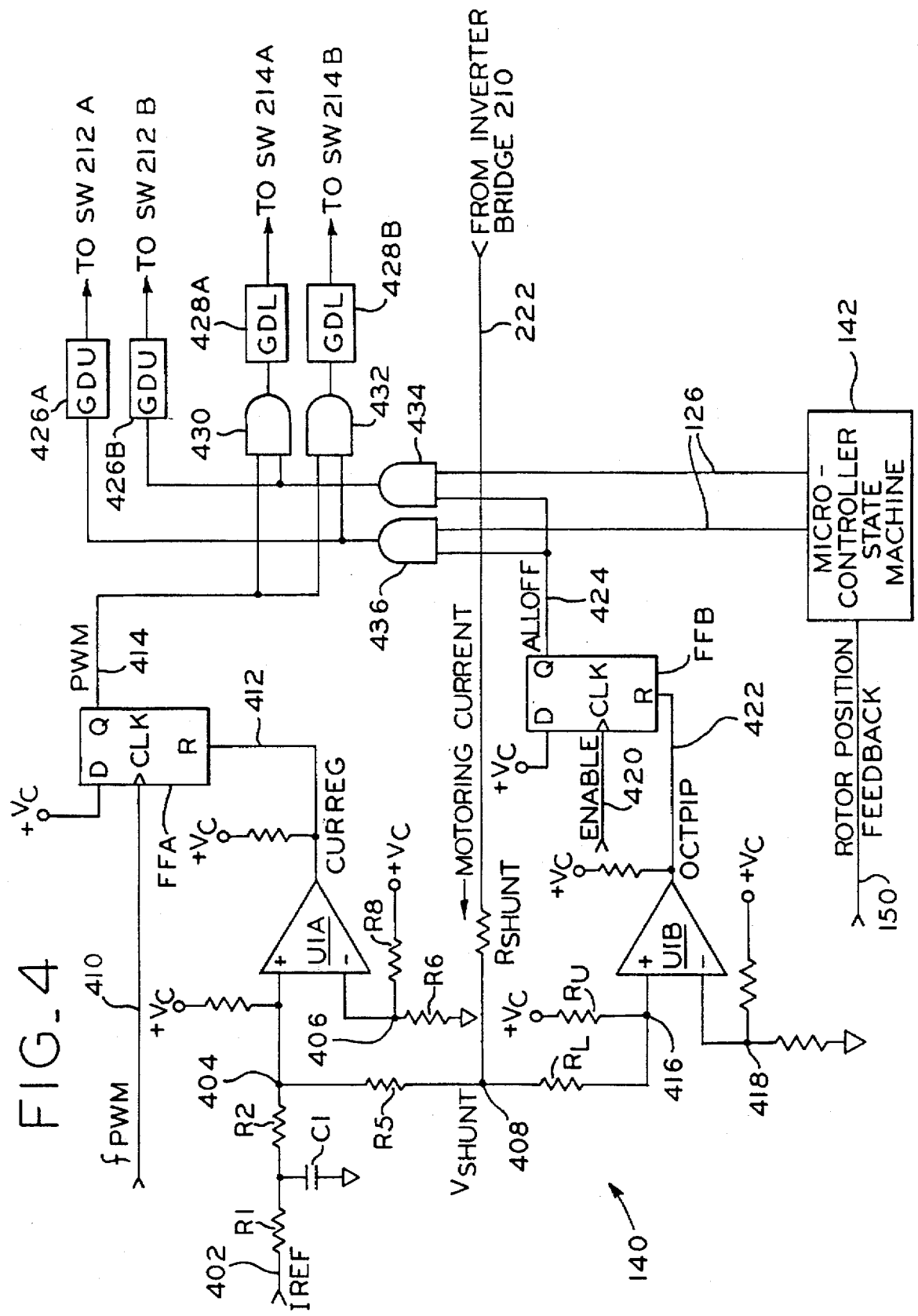
FIG_4

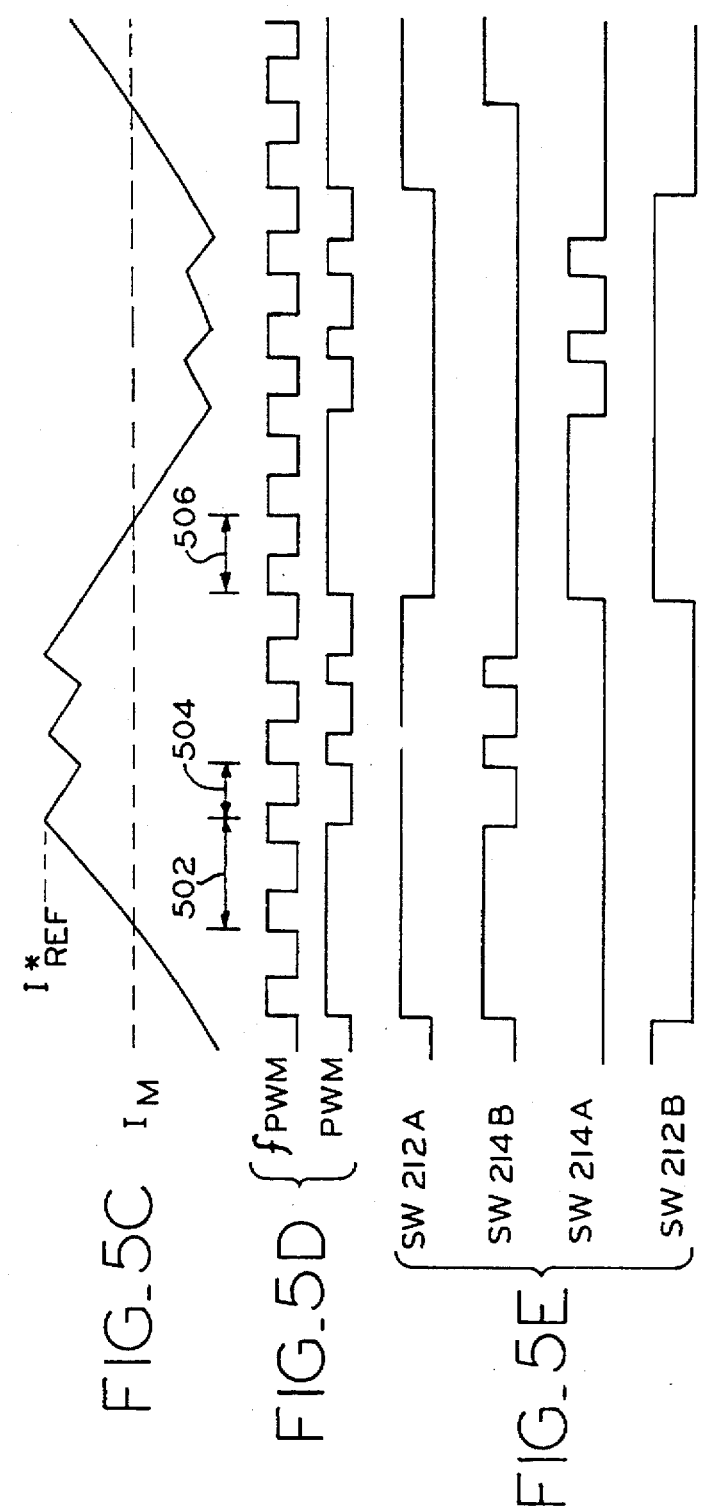
FIG_5A BACK EMF
FIG_5B COMMUTATE SIGNALS
FIG_5C $I_M$
FIG_5D $\{f_{PWM}, PWM\}$
FIG_5E {SW 212A, SW 214B, SW 214A, SW 212B}

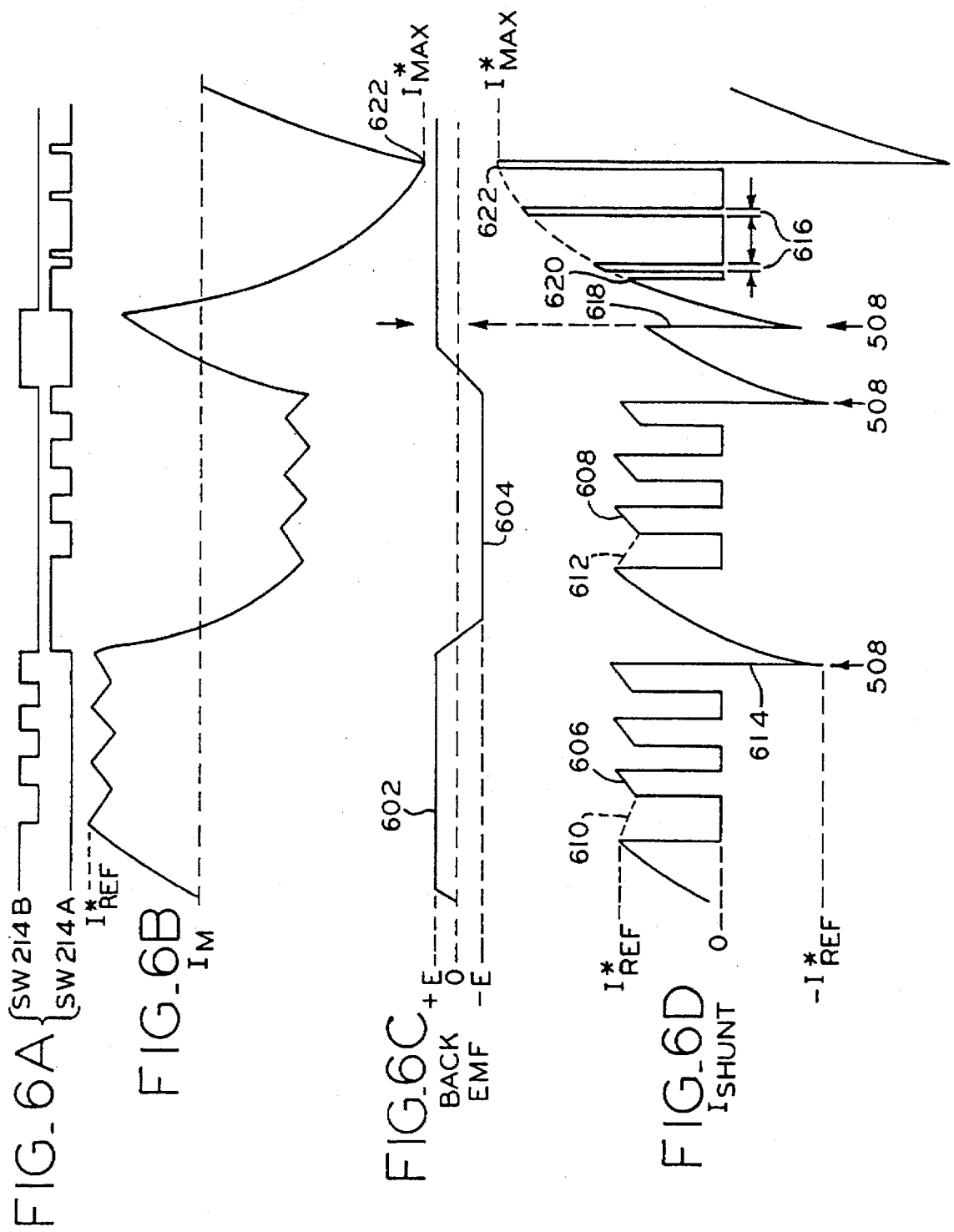

SYSTEMS AND METHODS FOR PROTECTING A SINGLE PHASE MOTOR FROM CIRCULATING CURRENTS

BACKGROUND OF THE INVENTION

This invention relates generally to a motor protection system and, particularly, to a system having an overcurrent protection circuit for detecting and controlling circulating currents in an electronically controllable, single phase motor using a single resistive shunt.

A motor system according to the present invention typically includes a brushless DC motor having an inverter bridge for driving the motor. The inverter bridge has a number of power switching devices with a flyback diode coupled to of the devices and is used to connect the motor's windings to a power supply through a power supply link. The power supply link has positive and negative rails connecting the motor to the power supply. Generally, such a motor system provides pulse width modulation (PWM) of the power to the windings by turning on and off one of the power switching devices. Under a normal PWM control scheme, the motor system turns off one device at a time which causes a flyback current to circulate in the inverter bridge. Such circulating currents result from energy stored in the phase winding inductances and flow through one power device and one diode in the inverter bridge. In normal operation, circulating currents decay rapidly because the motor back electromotive force (EMF) opposes their flow. In abnormal operation, however, the enabled power switches and the polarity of the back EMF are not in synchronism and circulating currents are generated. The back EMF causes the circulating currents to increase rather than to decay which can result in damage to the current-carrying power devices as well as to the motor's permanent magnets. A momentary reversal of rotation at start-up or being out of position due to a failure to properly sense rotor position are examples of abnormal operation causing increasing circulating currents.

Generally, current sensors are required in all phases of a motor to determine what currents are in the motor. The costs associated with isolated current sensors (e.g., current transformers or Hall-effect sensors) as well as integrated current sensors, however, are often prohibitive of their use in many applications. The use of a single current sensing element, such as a resistive shunt, that is located in one of the DC power buses supplying an inverter is also known. Although less expensive, the conventional use of such shunts has several disadvantages. Primarily, systems employing only a single current sensing element are unable to detect dangerous circulating currents in the inverter switches, rectifiers and motor phases because such current does not flow in and, thus, cannot be observed in a shunt resistor (or other current sensor) in the power supply link.

One technique for detecting and controlling circulating currents that employs a single shunt on the DC negative bus is to pulse width modulate the enabled power switching devices (upper and lower) simultaneously. As such, current is detectable at the shunt and may be compared to a reference level. Disadvantageously, however, this technique results in excessive switching losses in the power devices, especially for motors having power ratings in the integral horsepower range. Another technique is to open all power switching devices simultaneously while the motor is operating. This technique, however, undesirably reduces torque production.

Therefore, a relatively inexpensive means for detecting and controlling circulating currents is needed that does not cause excessive power losses or loss of torque production.

Brushless DC motors are disclosed in, for example, U.S. Pat. Nos. 5,423,192 and 4,757,241 as well as application Ser. No. 08/352,393, all of which are commonly assigned with the present application and the entire disclosures of which are incorporated herein by reference. Single phase motors are disclosed in, for example, U.S. Pat. Nos. 5,483,139, 5,465,019, 5,140,243, 4,724,678, 4,635,349, 4,626,755, 4,313,076 and 3,134,385, all of which are commonly assigned with the present application and the entire disclosures of which are incorporated herein by reference.

SUMMARY OF THE INVENTION

Among the several objects of this invention may be noted the provision of an improved motor system and control method which permits use of a single current sensing element; the provision of such system and method which permits detection and control of abnormal circulating currents in the motor; the provision of such system and method which forces circulating currents through the single current sensing element independent of current regulation in the motor; the provision of such system and method which provides a minimum interval of motor conduction; and the provision of such a current regulation circuit which is economically feasible and commercially practical.

Briefly described, a single phase motor embodying aspects of the invention has a stationary assembly including a winding and a rotatable assembly in magnetic coupling relation to the stationary assembly. The motor also includes a power supply link having power switches responsive to a motor control signal for selectively connecting the winding to a power supply in alternating on and off intervals to produce an electromagnetic field for rotating the rotatable assembly. A current sensing circuit senses current in the power supply link during the on intervals of the power supplied to the winding. The motor further includes a current regulation circuit and an overcurrent circuit. The current regulation circuit generates a current regulation signal representative of the difference between the sensed current in the power supply link and a peak regulated current level that is a function of a desired speed and/or torque of the motor. The overcurrent circuit generates an overcurrent signal in response to the sensed current in the power supply link exceeding a maximum current level greater than the peak regulated current level. The motor also has a control circuit responsive to the current regulation signal for generating the motor control signal thereby to regulate current in the winding and control the speed and/or torque of the motor. At least one of the on intervals, when power is being supplied to the winding in response to the motor control signal, is greater than or equal to a minimum interval which is independent of the current regulation signal. The control circuit is also responsive to the overcurrent signal which causes the power switches to disconnect the winding from the power supply thereby preventing excessive current from circulating in the motor.

Another embodiment of the invention is a system for driving a rotatable component of a laundering apparatus. The system includes a single phase motor having a stationary assembly and a rotatable assembly in magnetic coupling relation to the stationary assembly. The stationary assembly has a winding and the rotatable assembly is in driving relation to the rotatable component. The system also includes a power supply link having power switches responsive to a motor control signal for selectively connecting the winding to a power supply in alternating on and off intervals to produce an electromagnetic field for rotating the rotatable assembly. A current sensing circuit senses current in the power supply link during the on intervals of the power supplied to the winding. The system further includes a current regulation circuit and an overcurrent circuit. The current regulation circuit generates a current regulation signal representative of the difference between the sensed current in the power supply link and a peak regulated current level that is a function of a desired speed and/or torque of the motor. The overcurrent circuit generates an overcurrent signal in response to the sensed current in the power supply link exceeding a maximum current level greater than the peak regulated current level. The system also has a control circuit responsive to the current regulation signal for generating the motor control signal thereby to regulate current in the winding and control the speed and/or torque of the motor. At least one of the on intervals, when power is being supplied to the winding in response to the motor control signal, is greater than or equal to a minimum interval which is independent of the current regulation signal. The control circuit is also responsive to the overcurrent signal which causes the power switches to disconnect the winding from the power supply thereby preventing excessive current from circulating in the motor.

Yet another embodiment of the invention is a protective circuit for a single phase motor having a stationary assembly including a winding and a rotatable assembly in magnetic coupling relation to the stationary assembly. The motor also has a control circuit for generating a motor control signal and a power supply link for supplying power from a power supply to the winding. The power supply link includes power switches responsive to the motor control signal for selectively connecting the winding to the power supply in alternating on and off intervals to produce an electromagnetic field for rotating the rotatable assembly. The protective circuit includes a current sensing circuit sensing current in the power supply link during the on intervals when power is being supplied to the winding. The protective circuit also includes first and second current comparator circuits. The first current comparator circuit compares the sensed current in the power supply link to a peak regulated current level and generates a current regulation signal representative of the difference between the sensed current and the peak regulated current level. The peak regulated current level is a function of a desired speed and/or torque of the motor. The control circuit of the motor is responsive to the current regulation signal for generating the motor control signal thereby to regulate current in the winding and control the speed and/or torque of the motor. The second current comparator circuit compares the sensed current in the power supply link to a maximum current level greater than the peak regulated current level and generates an overcurrent signal when the sensed current exceeds the maximum current level during the on intervals when power is being supplied to the winding. At least one of the on intervals is greater than or equal to a minimum interval which is independent of the current regulation signal. The control circuit is also responsive to the overcurrent signal which causes the power switches to disconnect the winding from the power supply thereby preventing excessive current from circulating in the motor.

In another form, the invention is directed to a method of operating a single phase motor. The motor has a stationary assembly including a winding and a rotatable assembly in magnetic coupling relation to the stationary assembly. The motor also has a power supply link including power switches for supplying power from a power supply to the winding. The method includes the steps of selectively connecting the winding to the power supply in alternating on and off intervals with the power switches in response to a motor control signal to produce an electromagnetic field for rotating the rotatable assembly and sensing current in the power supply link during the on intervals when power is being supplied to the winding. The method also includes generating a current regulation signal and generating an overcurrent signal. According to the method, the current regulation signal is representative of the difference between the sensed current in the power supply link and a peak regulated current level which is a function of a desired speed and/or torque of the motor. The overcurrent signal is generated in response to the sensed current in the power supply link exceeding a maximum current level greater than the peak regulated current level. The method further includes the step of generating the motor control signal in response to the current regulation signal thereby to regulate current in the winding and control the speed and/or torque of the motor. At least one of the on intervals, when power is being supplied to the winding in response to the motor control signal, is greater than or equal to a minimum interval which is independent of the current regulation signal. The method further includes the step of generating a motor control signal in response to the overcurrent signal for causing the power switches to disconnect the winding from the power supply thereby preventing excessive current from circulating in the motor.

In yet another form, the invention is directed to a method of operating a system for driving a rotatable component of a laundering apparatus. The system includes a single phase motor having a stationary assembly and a rotatable assembly in magnetic coupling relation to the stationary assembly. The stationary assembly includes a winding and the rotatable assembly is in driving relation to the rotatable component. The motor also has a power supply link including power switches for supplying power from a power supply to the winding. The method includes the steps of selectively connecting the winding to the power supply in alternating on and off intervals with the power switches in response to a motor control signal to produce an electromagnetic field for rotating the rotatable assembly and sensing current in the power supply link during the on intervals when power is being supplied to the winding. The method also includes generating a current regulation signal and generating an overcurrent signal. According to the method, the current regulation signal is representative of the difference between the sensed current in the power supply link and a peak regulated current level which is a function of a desired speed and/or torque of the motor. The overcurrent signal is generated in response to the sensed current in the power supply link exceeding a maximum current level greater than the peak regulated current level. The method further includes the step of generating a motor control signal in response to the current regulation signal thereby to regulate current in the winding and control the speed and/or torque of the motor. At least one of the on intervals when power is being supplied to the winding in response to the motor control signal is greater than or equal to a minimum interval which is independent of the current regulation signal. The method further includes the step of generating the motor control signal in response to the overcurrent signal for causing the power switches to disconnect the winding from the power supply thereby to prevent excessive current from circulating in the motor.

In yet another form, the invention is directed to a method of protecting a single phase motor from excessive currents circulating in the motor. The motor has a stationary assembly including a winding and a rotatable assembly in magnetic coupling relation to the stationary assembly. The motor also has a control circuit for generating a motor control signal and a power supply link for supplying power from a power supply to the winding. The power supply link includes power switches responsive to the motor control signal for selectively connecting the winding to the power supply in alternating on and off intervals to produce an electromagnetic field for rotating the rotatable assembly. The method includes the step of sensing current in the power supply link during the on intervals when power is supplied to the winding. The method also includes comparing the sensed current in the power supply link to a peak regulated current level which is a function of a desired speed and/or torque of the motor and generating a current regulation signal representative of the difference between the sensed current and the peak regulated current level. The control circuit is responsive to the current regulation signal for generating the motor control signal thereby to regulate current in the winding and control the speed and/or torque of the motor. The method further includes the step of defining a minimum interval independent of the current regulation signal during which the winding is connected to the power supply wherein at least one of the on intervals, when power is being supplied to the winding in response to the motor control signal, is greater than or equal to the minimum interval. The method also includes the steps of comparing the sensed current in the power supply link to a maximum current level greater than the peak regulated current level and generating an overcurrent signal when the sensed current exceeds the maximum current level. The method also includes the step of causing the power switches to disconnect the winding from the power supply in response to the overcurrent signal thereby to prevent excessive current from circulating in the motor.

Alternatively, the invention may comprise various other systems and methods.

Other objects and features will be in part apparent and in part pointed out hereinafter.

BRIEF DESCRIPTION OF THE DRAWINGS

FIG. 4 is a schematic diagram of the current comparator circuit of FIG. 1.

FIGS. 5A–5E are exemplary timing diagrams illustrating the relationship of back EMF and peak current in the motor of FIG. 1 to a preferred commutation strategy of the invention.

FIGS. 6A–6D are exemplary timing diagrams illustrating the relationship between the currents in the motor of FIG. 1 and current regulation for normal and abnormal operation of the motor of FIG. 1 according to the commutation strategy of FIGS. 5A–5E.

Corresponding reference characters indicate corresponding parts throughout the drawings.

DETAILED DESCRIPTION OF PREFERRED EMBODIMENTS

Figure 1:
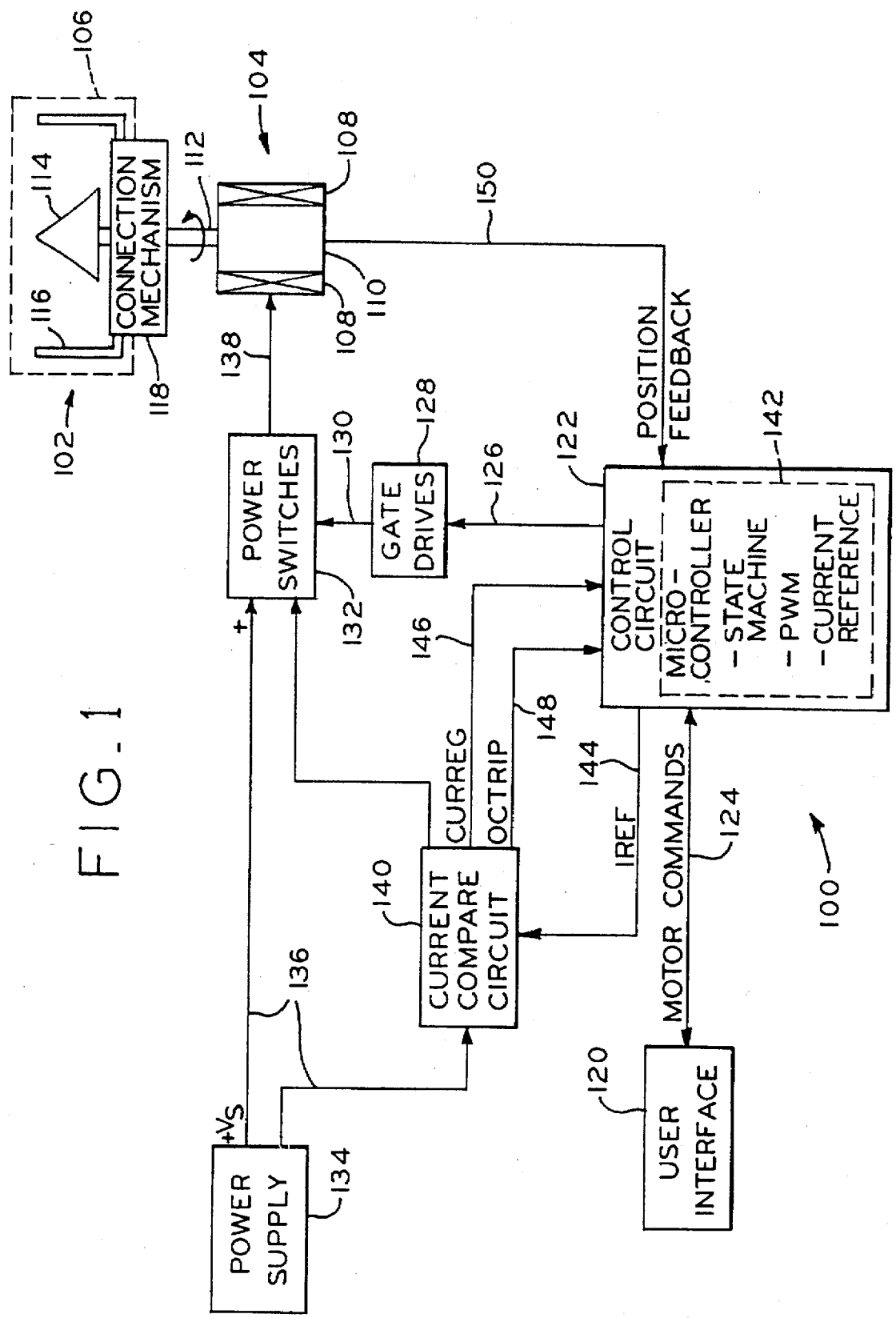
FIG. 1 is a block diagram of a preferred embodiment of a motor drive system of the invention and including a current comparator circuit and control circuit according to the invention.

FIG. 1 shows a system 100 according to a preferred embodiment of the present invention. The system 100 may be used with an automatic washing or laundry machine 102 and includes a motor 104 for driving a rotatable component 106 of the laundry machine 102. The motor 104 has a stationary assembly or stator 108 and a rotatable assembly or rotor 110 in magnetic coupling relation to the stator 108. According to the invention, motor 104 is a single phase, electronically commutated motor. It is to be understood, however, that motor 104 may be any electronically controllable motor. Such motors may be any electronically controllable motor or dynamoelectric machine typically powered by an electronic commutating circuit. Such motors include, for example, external rotor motors (i.e., inside out motors), permanent magnet motors, single and variable speed motors, selectable speed motors having a plurality of speeds, and brushless dc motors, including electronically commutated motors, switched reluctance motors and induction motors. In addition, the motors may be multiphase motors or single phase motors and, in any case, such motors may have a single split phase winding or a multi-phase winding. Such motors may also provide one or more finite, discrete rotor speeds selected by an electrical switch or other control circuit.

In a preferred embodiment of the invention, the rotor 110 is mechanically connected via a motor shaft 112 to a particular device to be driven, such as the rotatable component 106. For example, rotatable component 106 comprises an agitator 114 and/or a basket 116 included in laundry machine 102. Preferably, laundry machine 102 also includes a connection mechanism 118 for coupling rotatable component 106 to the shaft 112. The connection mechanism 118 may comprise a fixed ratio speed reducer, such as a gear box or a pulley arrangement or, in some applications, shaft 112 of motor 104 may be directly coupled to the agitator 114 and the basket 116. Although disclosed for use with agitator 114 and basket 116, it is to be understood that motor 104 may be part of a number of different systems for driving a rotatable component. For example, rotatable component 106 may be a fan or compressor.

In laundering apparatus, such as laundry machine 102, agitator 114 and basket 116 are rotatable within a tub (not shown) which holds the water for washing the fabrics to be laundered. Preferably, agitator 114 and basket 116 are coaxially mounted and rotated either independently or jointly about their common axis. Agitator 114 and basket 116 together agitate water and fabrics to be laundered thereby washing the fabrics and thereafter spinning them to cause centrifugal displacement of water from the tub. Motor 104 is coupled selectively through connection mechanism 118 to agitator 114 alone during the wash cycle and to both basket 116 and agitator 114 in the spin cycle.

System 100 preferably includes a user interface 120 for providing system control signals to a control circuit 122 via line 124. For example, the system control signals represent desired washing times, desired washing cycles, and the like. As represented by the block diagram of FIG. 1, the control circuit 122 provides a motor control signal, or commutation signal, via line 126 in the form of gate drive signals for electronically controlling a plurality of gate drives 128. In turn, the gate drives 128 provide enough signal conditioning via line 130 to switch a plurality of power switches 132, such as IGBT's, BJT's or MOSFET's, for example. In addition to providing voltage signals shifted from, for example, 5 volts to 15 volts for driving the power switches 132, gate drives 128 also condition the signals provided from control circuit 122 via line 126 for optimal operation of power switches 132. Power switches 132, driven by gate drives 128, control rotation in motor 104 in response to the commutation signal.

A power supply 134 provides high voltage DC power via lines 136 to power switches 132 for commutating a winding 310 (see FIGS. 3A-3D) included in stator 108 of motor 104. Power switches 132 provide power via line 138 to motor 104 in at least one preselected sequence by selectively switching the power supply 134 in connection with the winding 310. As such, lines 136 and 138 in combination with power switches 132 constitute a power supply link for connecting power supply 134 to winding 310. It is to be understood that power supply 134 may also provide power to operate control circuit 122 which drives power switches 132 by gate drives 128.

According to the invention, control circuit 122 generates motor control signals, or commutation signals, via line 126. The commutation signals cause system 100 to produce a peak current that matches the load torque demand as a function of a peak regulated current reference signal IREF. Matching torque load with produced torque causes motor 104 to operate at a desired torque or speed. The commutation signals preferably include a series of pulse width modulated cycles, wherein each cycle causes a corresponding switching event of power switches 132. Winding 310 of motor 104 is adapted to be commutated in at least one preselected sequence and power switches 132 selectively provide power to winding 310 in the preselected sequence. Current in winding 310 produces an electromagnetic field for rotating rotor 110 of motor 104. To control the speed of component 106, system 100 preferably controls the speed of motor 104 by controlling the power delivered to the load. By regulating current in motor 104, which in turn regulates torque, system 100 obtains the desired motor speed by matching the load and motor loss demand torque at the desired speed.

Referring further to FIG. 1, system 100 also includes a current comparator circuit 140 (shown in detail in FIG. 4) for sensing current in the power supply link. The current comparator circuit 140 cooperates with a microcontroller 142 resident in control circuit 122 for regulating current in system 100. Particularly, as described in detail below, the microcontroller 142 and comparator circuit 140 regulate circulating currents in motor 104 during periods or intervals when only one of power switches 132 is conducting. FIG. 1 illustrates current comparator 140 external to control circuit 122 and microcontroller 142 internal to control circuit 122. Alternatively, both circuits may be either external or internal to control circuit 122.

According to one preferred embodiment of the invention, current comparator circuit 140 first senses current in the power supply link. As shown in FIG. 4, current comparator circuit 140 comprises two current comparator circuits for independently comparing the sensed current to a peak regulated current level and to a maximum current level. In the illustrated embodiment, the peak regulated current level is determined by a processor, such as microcontroller 142, and communicated to current comparator circuit 140 via line 144. Preferably, this desired current reference is a pulse width modulated signal IREF having a variable duty cycle representative of the desired current. For example, the duty cycle of IREF may vary from 0% to 100% where 100% corresponds to a maximum regulated current value and the duty cycle is proportional to the desired current. In the alternative, control circuit 122 generates a variable voltage signal, the magnitude of which represents the desired current. Other suitable means for generating the peak regulated current level include a simple resistor circuit or potentiometer.

According to the invention, current comparator circuit 140 compares the sensed current in the power supply link to the peak regulated current level, as represented by IREF, and generates a current regulation signal CURREG as a function of the comparison. Control circuit 122 receives the signal CURREG via line 146 for regulating current in motor 104. A pulse width modulation (PWM) state machine, shown as part of microcontroller 142 in a preferred embodiment, generates switch commands as a function of CURREG to effect current regulation in system 100. In this manner, system 100 controls the speed and/or torque of motor 104 as a function of the current regulation signal CURREG. In the alternative, it is contemplated that system 100 may implement a voltage regulated control strategy rather than a current regulated one.

For example, a pair of switches 132 are enabled by control circuit 122 for normal motoring operation. The state machine of microcontroller 142, operating as a commutator estimator circuit, causes the pair of switches 132 to be enabled wherein one of the two performs pulse width modulation while the other remains in its on state for the entire commutation interval as commanded by the commutation logic. The polarity of the motor back EMF during this time interval is counter to the supply voltage so that the driving electromotive force to develop current in motor 104 is the supply minus the back EMF.

Current comparator circuit 140 further compares the sensed current in the power supply link to the maximum current level. The maximum current level is, for example, 20–50% greater than the peak regulated current level. Preferably, the maximum current level is fixed according to the power limitations of power switches 132, control circuit 122 and/or motor 104. According to the invention, current comparator circuit 140 compares the sensed current in the power supply link to the maximum current level and generates an overcurrent signal OCTRIP when the sensed current exceeds the maximum current level. In turn, control circuit 122 receives the signal OCTRIP via line 148 and sets the PWM state machine accordingly to disable power switches 132 and disconnect winding 310 from power supply 134. In this manner, system 100 prevents excessive currents in motor 104.

Figure 2:
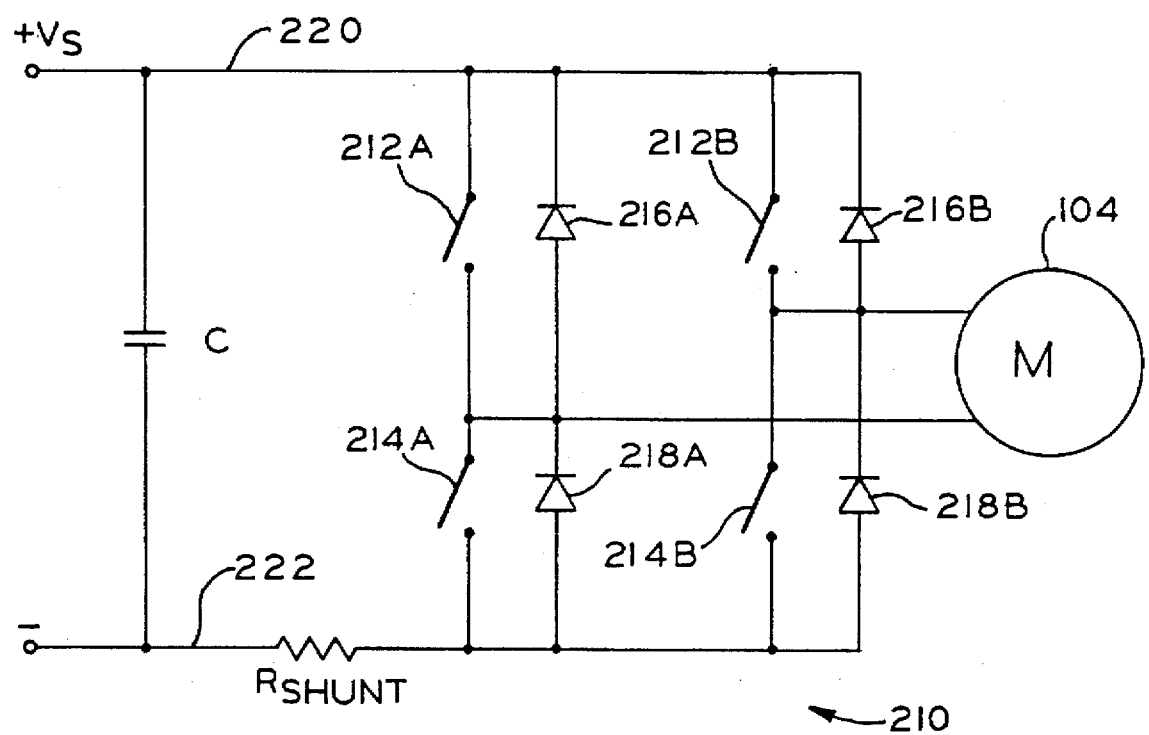
FIG. 2 is a schematic diagram of an inverter bridge for driving the motor of FIG. 1.

In a preferred embodiment of the invention, power switches 132 consist of an inverter bridge 210 which has a plurality of switches 212A, 212B, 214A, 214B and corresponding flyback diodes 216A, 216B, 218A, 218B (shown in detail in FIG. 2). By selectively switching power switches 132, system 100 energizes winding 310 of motor 104. Control circuit 122 further commands pulse width modulation of the power applied to the energized winding 310 for control purposes. System 100 provides PWM control of the power to winding 310 by turning on and off one of power switches 132. By doing so, the PWM control scheme of system 100 causes a flyback current to circulate when only one of power switches 132 and one flyback diode are conducting. The inverter bridge 210 preferably operates from a single commutating signal which selects switches 212A and 214B or 212B and 214A depending on the position of rotor 110. Only one switch (e.g., switch 214A or 214B) is involved in current regulation (pulse width modulating) at any given time. As an example, commonly assigned U.S. Pat. No. 4,757,603, the entire disclosure of which is incorporated herein by reference, shows a PWM control of a motor.

Referring further to FIG. 1, control circuit 122 receives signals via line 150 from motor 104 representative of the position of rotor 110. According to a preferred embodiment of the invention, a Hall sensor (not shown) provides position feedback signals to control circuit 122. A pair of Hall sensors (not shown) positioned 90° out of phase from each other may be used if the particular application of the invention requires faster reversals. In the alternative, control circuit 122 receives position feedback signals representative of a back electromotive force (EMF) in winding 310. Other position sensors, such as optical sensors, may also be used to provide feedback concerning the position of rotor 110 instead of or in addition to the Hall sensor signals or the back EMF signal. Preferably, the rotor position feedback signal is at a predefined angular relationship from the motor back EMF. Since it is desired that motor current crosses zero at the time the motor back EMF also crosses zero, in a preferred embodiment of the invention, motor 104 is commutated at an angle before the back EMF zero crossing.

Control circuit 122 preferably determines the position of rotor 110 as a function of the zero crossings and generates commutation signals in response thereto. The commutation instances of winding 310 are determined from the information about the zero crossings of back EMF in winding 310. Torque production in motor 104 is then determined by the product of the current and the back EMF. It is necessary to energize winding 310 when the back EMF has crossed zero in the direction that will oppose the voltage energizing it in order to sustain positive torque. In other words, control circuit 122 controls commutation as a function of the elapsed time between commutations and the estimated zero crossings of the back EMF waveform and generates gate drive signals at line 126 for driving power switches 132 in response to the position sensing. Commonly assigned U.S. Pat. No. 5,423,192, the entire disclosure of which is incorporated herein by reference, describes one preferred means for detecting zero crossings.

As shown in FIG. 2, power switches 132 are part of the inverter bridge 210. In a preferred embodiment, inverter bridge 210 comprises an H-bridge having a positive rail 220 and a negative rail 222 supplied by power supply 134. Power switches 132 include the two upper switches 212A and 212B and the two lower switches 214A and 214B. Flyback diodes 216A, 216B and 218A, 218B are coupled in an anti-parallel relationship with each switch of switches 212A, 212B and 214A, 214B, respectively.

A preferred excitation scheme for motor 104 involves commanding two switches on during each commutation interval, one from upper switches 212A, 212B and one from lower switches 214A, 214B. In other words, power switches 132 are activated in pairs wherein winding 310 connects to power supply 134 through one of upper switches 212A, 212B and a diagonally-positioned one of lower switches 214A, 214B. Control circuit 122 selects which of upper switches 212A, 212B and lower switches 214A, 214B is to be used for pulse width modulating the power applied to winding 310 at a given time. In a preferred embodiment, only lower switches 214A, 214B are used for pulse width modulation.

A shunt resistor, current transformer, Hall-effect current sensor, integrated current sensor or other sensor or circuit known in the art may be used to sense the winding or motoring current of motor 104. In a preferred embodiment, system 100 includes a single resistive shunt $R_{SHUNT}$ in the negative rail 222 of inverter bridge 210. Only the motor current flows through the shunt resistor $R_{SHUNT}$ when power is being exchanged from power supply 134 to motor 104 and vice versa. Although shunt resistor $R_{SHUNT}$ senses motor current, it cannot directly detect circulating currents in inverter bridge 210 because the circuit involving shunt resistor $R_{SHUNT}$ is open circuited during intervals when only one of power switches 132 is conducting. A single resistive shunt on the DC bus is the most cost-effective means of sensing motor currents on an inverter-driven machine.

Figure 3A:
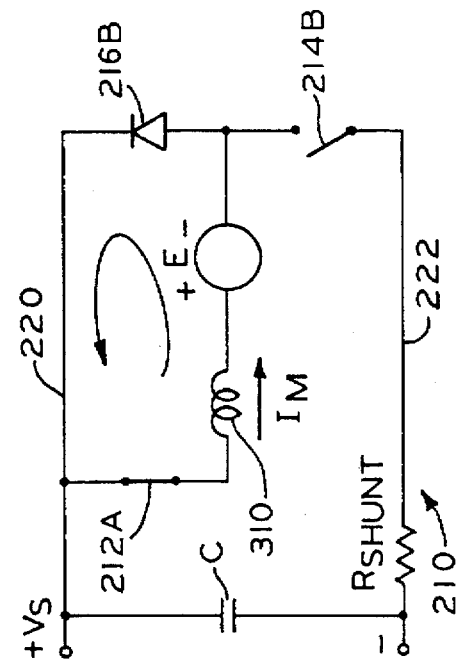
FIGS. 3A–3D are schematic diagrams illustrating exemplary circuit topologies in the motor of FIG. 1.

Referring now to FIGS. 3A–3D, simplified circuit diagrams show the current in inverter 210 and motor winding 310 at different instances in time. As an example of the normal operation of inverter bridge 210, gate drives 128 drive power switches 132 to connect winding 310 to power supply 134 by causing upper switch 212A and lower switch 214B to be in a conducting state. Control circuit 122 further controls one of the active switches (e.g., lower switch 214B) to pulse width modulate the power being applied to winding 310. Immediately at turn-on, switches 212A and 214B, for example, become conducting with switch 214B being used for pulse width modulation. A diode recovery current may flow through diode 216B before sufficient charge has been removed to establish diode blocking and both the motor winding current and diode recovery current flow through shunt resistor $R_{SHUNT}$ at this time. The diode recovery current normally decays and the motor current, as shown in FIG. 3A, continues to flow in motor 104 (and through shunt resistor $R_{SHUNT}$) when switch 212A and switch 214B are conducting. During this interval, the net voltage driving the motor current is the supply voltage less the back EMF (i.e., $V_{NET}=V_S-E$). Further, since the back EMF and the motor current have the same polarity, power flow is from power supply 134 to motor 104.

Figure 3C:
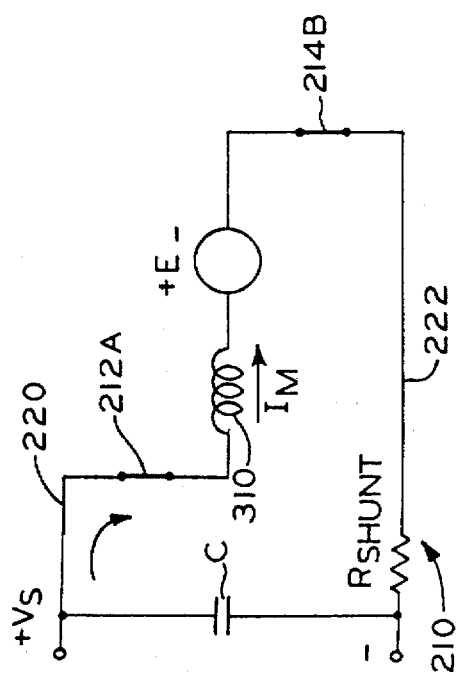
Figure 3B:
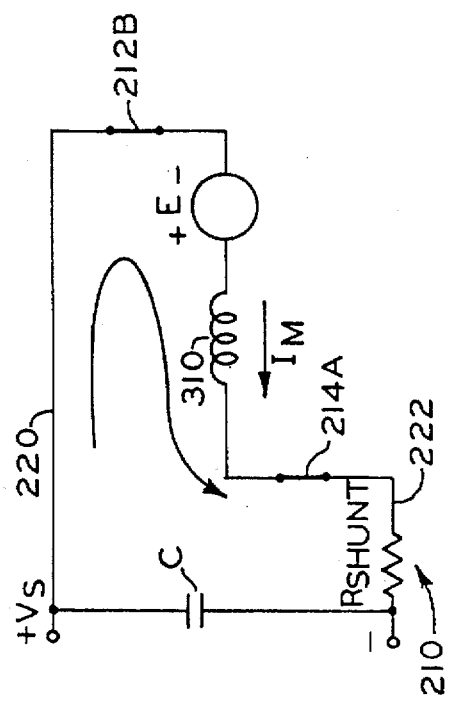

FIG. 3B Shows a circulating current path which exists when switch 214B is in a nonconducting state. As described above, the PWM control of system 100 turns off one of power switches 132 at a time (lower switch 214B in FIG. 3B) which causes a flyback current to circulate through the conducting power switch (upper switch 212A) and one of the flyback diodes (diode 216B). As shown in FIG. 3B, a circulating loop involves motor 104, one switch (i.e., switch 212A) and one diode (i.e., diode 216A) of inverter 210. However, such currents do not flow in rail 222 and, thus, shunt resistor $R_{SHUNT}$ (or other shunt current sensor) is unable to observe these circulating currents. In normal operation, circulating currents decay rapidly because the motor back EMF, which is illustrated as voltage E, opposes their flow. In abnormal operation, the back EMF causes circulating currents to increase rather than decay. A momentary reversal of rotation at start-up or being out of position due to a failure to properly sense the position of rotor 110 are examples of abnormal operation causing increasing circulating currents.

Generally, on an inverter H-bridge driving a single phase motor, such as illustrated in FIG. 2, motor back EMF and loop impedance cause circulating currents when the motor phase is commutated, when motor current is being regulated by pulse width modulating one power device at a time, and when a loss of synchronization occurs between the control of motor 104 and the rotation of rotor 110. Such circulating currents may occur when motor 104 is first started because the rotor position is in advance or behind the intended field rotation and, for example, the advancing field forces a reversal in the rotation of rotor 110 when it has started in a direction opposite to the field rotation. The back EMF is usually low enough during start-up that very large out-of-position currents are not generated. In systems with Hall position sensors, for example, out-of-position occurs due to errors in the control, fast load changes where the control cannot catch up to the rotor position, noise, errors in position sensing and so forth. In low power motor drives, such currents are managed by using higher current ratings of the power switching devices and permanent magnets. However, in higher power motor drives, higher rated motor magnets and power switches is not economically feasible.

FIG. 3C illustrates current flowing back to power supply 134 from winding 310 immediately after a commutation event. During this interval, motor current decays via diodes 218A, 216B. Although switches 214A, 212B are commanded on, the motor current must decay to zero before the switches start to conduct current in the opposite direction.

Figure 3D:
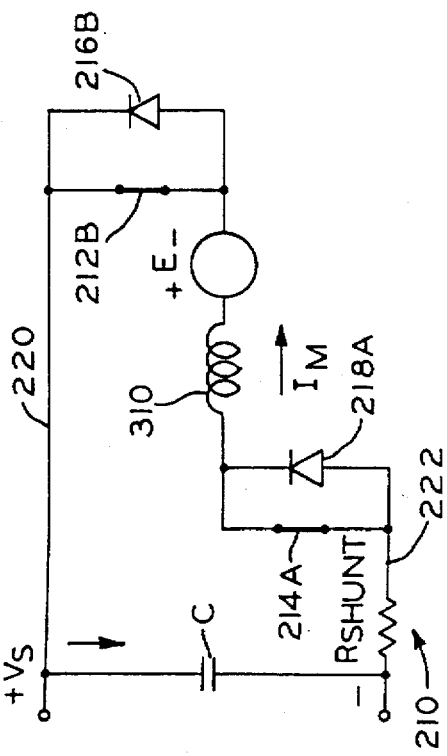

FIG. 3D illustrates an instance in which commutation has occurred out of synchronization with the back EMF. During this interval, the net voltage driving the motor current is the supply voltage plus the back EMF (i.e., $V_{NET}=V_S+E$). Since the back EMF and the motor current have opposing polarities, the higher net voltage driving motor winding 310 causes motor current to build up faster than during the interval shown in FIG. 3A.

As described above, one technique for detecting and controlling circulating currents that employs a single shunt on the DC negative bus is to pulse width modulate the enabled power switching devices (upper and lower) simultaneously. Only then is the current detectable at the shunt where it may be compared to a reference level. Disadvantageously, however, this technique results in additional switching losses in the power devices. Another technique is to open all power switching devices simultaneously while the motor is operating. This technique, however, undesirably reduces torque production.

In contrast to conventional systems, system 100 monitors circulating currents when they occur on a cycle-by-cycle basis at normal PWM switching frequency and regulates motor current by pulse width modulating only one of the enabled power switches 132 on a cycle-by-cycle basis. System 100, operating according to the invention, essentially forces the circulating currents to flow through the power supply link shunt $R_{SHUNT}$ for a short duration at regular time intervals. As described above, in addition to performing current regulation comparisons, current comparator circuit 140 compares the current to the maximum allowed current which is different than the current regulation value. When the current exceeds this maximum limit, control circuit 122 causes motor 104 to immediately turn off by opening all power switches 132. As such, the present invention permits the use of inverter and motor elements which have a lower current capacity than the capacity required to withstand uncontrolled motor circulating currents, prevents the development of large circulating currents which can demagnetize the rotor magnets, and provides such protection of motor 104 and control circuit 122 against circulating currents involving motor winding 310 and elements of inverter bridge 210 without degrading motor performance.

At normal operating conditions, the supply voltage (shown as voltage $V_s$ in FIGS. 3A–3D) minus the generated back EMF (shown as voltage E in FIGS. 3A–3D) comprises the forcing voltage source for building current in motor winding 310. When a pair of switches (e.g., switches 212A and 214B) is commanded on, current builds up to the regulating level. Upon reaching the regulating level, control circuit 122 turns off one of the switches (e.g., switch 214B) for a short time interval. During this time interval, motor current decays in a circulating loop until the "off time" expires and another PWM cycle is initiated. The polarity of the motor back EMF prevents the increase of circulating current. Control circuit 122 preferably includes an off timer circuit (not shown) and regulates the current in motor 104 as a function of the peak regulated current level IREF by turning off power to winding 310 for a predefined amount of time based on, for example, a portion of a commutation interval. In other words, control circuit 122 regulates current in motor winding 310 by pulse width modulation. In one preferred embodiment, system 100 uses a constant "off time" scheme for regulating current. In the alternative, a constant frequency scheme may be used (see FIG. 4).

At abnormal operating conditions resulting from, for example, a loss of synchronism with the actual position of rotor 110, switches 132 are no longer enabled with respect to rotor position. Because at least one of the inverter switches (e.g., switch 212A or switch 212B) is continuously enabled, stimulation by the back EMF causes circulating current. The supply voltage then drives motor current when two of switches 132 are enabled. Aided by the back EMF, motor current builds up quickly and exceeds the regulating level at which one of the switches (e.g., switch 214A or switch 214B) is turned off. During this time interval, motor current increases driven by the back EMF alone. At the expiration of the off time, both switches conduct and the actual motor current is diverted through shunt resistor $R_{SHUNT}$ to complete the PWM cycle while its magnitude continues to increase. At every PWM cycle, power switches 132 divert the motor current through shunt resistor $R_{SHUNT}$ for a short duration while its magnitude increases during the time interval one of the switches (e.g., switch 214A or switch 214B) is in the PWM off state. A minimum interval of time (for example, 5 microseconds) is needed to transfer the motor current from the circulating loop through shunt resistor $R_{SHUNT}$ back to supply 134. When two of switches 132 are conducting, current flows through shunt resistor $R_{SHUNT}$ regardless of the circulating current level or the commanded current level. In other words, system 100 samples motor current every PWM cycle and compares the current detected at resistor $R_{SHUNT}$ against the maximum current level which is usually higher than the peak regulated current level. As described above, the peak regulated current is the current commanded by control circuit 122 at which motor 104 is to operate. The amplitude of this current, which controls the motor torque production, is usually variable from a near zero level to a maximum level in a fully variable torque application mode.

Referring now to FIG. 4, independent current detectors are used to sense both the normal operating currents and the circulating currents. FIG. 4 illustrates a preferred circuit schematic of current comparator circuit 140 according to the invention. Current comparator circuit 140 includes a comparator U1A for normal current regulation and includes a comparator U1B for detecting circulating currents. The comparator U1A compares the sensed current in the power supply link (i.e., the current in $R_{SHUNT}$) to the peak regulated current level, as represented by IREF. Comparator U1A then generates a current regulation signal CURREG as a function of the comparison. In turn, control circuit 122 receives the signal CURREG and generates the commutation signal as a function of CURREG to effect current regulation in system 100. Independent of the current regulation function, the comparator U1B compares the current in $R_{SHUNT}$ to a reference ITRIP which is set at a level higher than the maximum operating currant level (e.g., 20–50% greater than the peak regulated current level). When current in shunt resistor $R_{SHUNT}$ exceeds the ITRIP reference, an overcurrent signal OCTRIP becomes active and causes control circuit 122 to turn off all of power switches 132 until commanded on again. In this embodiment, a low OCTRIP signal from current comparator circuit 140 initiates the ALL OFF condition commanding each of power switches 132 to be nonconducting.

In particular, control circuit 122 applies a desired current reference signal IREF to current comparator circuit 140 via line 402. Preferably, the desired current signal is representative of the peak regulated current level. In this embodiment of the invention, microcontroller 142 of control circuit 122 generates IREF as a PWM signal having a duty cycle which varies from 0–100%. In other words, control circuit 122 applies the circuit supply voltage $V_c$ via line 402 at a duty cycle, d, the current reference being proportional to the duty cycle, d. Resistors $R_1$ and $R_2$ and capacitor $C_1$ then filter the PWM signal to reduce the ac component at node 404. In the alternative, the resistor-capacitor network comprised of $R_1$, $R_2$ and $C_1$ may be replaced by a resistor connected to a variable voltage reference VREF representative of the desired current. Alternatively, any D/A converter, such as an R2R resistor network, could be used. Comparator U1A performs a comparison to determine if the sensed current in the power supply link exceeds the peak regulated current level as represented by IREF. In this embodiment of the invention, control circuit 122 applies the variable voltage signal at node 404 to the noninverting input of comparator U1A for comparison to its inverting input at node 406. The voltage at node 406 is preferably set to 0 volts or slightly higher by resistors $R_8$ and $R_5$. Current through shunt resistor $R_{SHUNT}$ in the direction indicated develops a voltage $V_{SHUNT}$ at node 408. This negative voltage $V_{SHUNT}$ at node 408 draws current from node 404 to pull down the voltage at node 404. When the voltage at node 404 is less than the voltage at node 406, the output of comparator U1A changes its state from high to low to indicate that the sensed current has reached the peak regulated current level.

System 100 includes a flip flop FFA which is clocked by the positive-going transitions of a signal $f_{PWM}$ input via line 410. The flip flop FFA has a reset input R connected via line 412 to comparator U1A and an output Q connected via line 414 to inverter bridge 210. The output Q remains high so long as the reset input R remains high. When the output of comparator U1A at line 412 (i.e., CURREG) changes state to a logic level low, indicating that the sensed current has reached the peak regulated current level, flip flop FFA resets and the output Q changes from high to low. The output Q remains low until the next $f_{PWM}$ transition occurs. In a preferred embodiment, $f_{PWM}$ is a pulse train at the pulse width modulation frequency.

Independent of comparator U1A, comparator U1B performs a comparison to determine if the sensed current in the power supply link exceeds the maximum current level. Preferably, a pair of resistors $R_U$ and $R_L$ set the maximum current level (i.e., the trip level ITRIP). In this embodiment of the invention, a voltage representing the trip level is applied at node 416 to the noninverting input of comparator U1B for comparison to its inverting input at node 418. The voltage at node 418 preferably represents an offset reference. When the voltage at node 416 is less than the voltage at node 418, the output of comparator U1B changes its state from high to low to indicate that the sensed current has exceeded the maximum current level.

System 100 also includes a flip flop FFB which is clocked by an enable signal ENABLE via line 420 from the state machine of microcontroller 142. The reset input R of flip flop FFB is connected via line 422 to comparator U1B and the output Q of flip flop FFB is connected via line 424 to inverter bridge 210. The output Q remains high so long as the reset input R remains high. When the output at line 422 (i.e., OCTRIP) changes state to a logic level low, indicating that the sensed current has exceeded the maximum current level, flip flop FFB resets and the output Q changes from high to low. The output Q remains low until the next ENABLE signal occurs. When the output Q of flip flop FFB goes low, it essentially removes signals that would otherwise command power switches 132. The ALL OFF condition remains set until the ENABLE signal is toggled and its positive-going transition again arms flip flop FFB. In one embodiment, microcontroller 142 generates another ENABLE signal to restart operation of motor 104 after the current decays below the peak regulated current level. However, if, after restarting motor 104, the overcurrent condition persists, motor 104 shuts down until manually reset. In the alternative, the ENABLE signal may be generated by a number of circuits or generated manually.

With respect to the control power switches 132, gate drives 128 comprise a pair of upper gate drives 426A, 426B for driving upper switches 212A, 212B, respectively, and a pair of lower gate drives 428A, 428B for driving lower switches 214A, 214B, respectively. In a preferred embodiment of the invention, the output Q of flip flop FFA, labeled PWM at line 414, controls the pulse width modulation of power supplied to winding 310. As described above, flip flop FFA outputs a signal which is a function of the current regulation signal CURREG and clocked at the PWM frequency $f_{PWM}$. As such, the output signal PWM is a pulse width modulated signal causing the lower gate drives 428A, 428B to selectively switch lower switches 214A, 214B on and off. Microcontroller 142 inputs state machine commands via lines 126 for enabling either upper switch 212A and lower switch 214B or upper switch 212B and lower switch 214A. The PWM signal is gated with the state machine commands via a pair of AND gates 430, 432 for activating either of lower gate drives 428A, 428B. In this instance, the term "state machine commands" refers to the commutation signals commanding which of power switches 132 are to be enabled for each commutation interval of motor 104. As an example of normal operation, microcontroller 142 generates commands for activating upper gate drive 426A to turn on upper switch 212A and for activating lower gate drive 428B to turn on lower switch 214B. In this instance, the PWM signal is gated with the state machine commands via AND gate 432 so that lower switch 214B is pulse width modulated at a duty cycle corresponding to the desired current. In other words, power switch 214B causes power to be supplied to winding 310 in alternating on and off intervals. At the next commutation interval, operation changes to upper switch 212B and lower switch 214A.

As described above, the output Q of flip flop FFB, labeled ALL OFF at line 424, goes low in response to the overcurrent signal OCTRIP at line 422. Another pair of AND gates 434, 436 gate the state machine commands with the ALL OFF signal to essentially remove the command signals from gate drives 128. As a result, all power switches 132 are disabled in response to the ALL OFF signal.

When none of power switches 212A, 212B and 214A, 214B are conducting, the currents in winding 310 are forced through shunt resistor $R_{SHUNT}$, two flyback diodes (diodes 218B and 216A), and a bulk capacitor C (see FIG. 2) connected across rails 220 and 222. Current passes through shunt resistor $R_{SHUNT}$ in the reverse direction until all of the energy stored in winding 310 is extracted and the motor current is forced to decay towards zero. Since the current through shunt resistor $R_{SHUNT}$ is now of an opposite polarity, voltage across shunt resistor $R_{SHUNT}$ is positive and the motor current is forced to decay toward zero. Thus, abnormal circulating currents are reduced to an acceptable level.

It is to be understood that capacitors may be used in the circuit of FIG. 4 to reduce noise associated with switching events.

Referring to FIGS. 5A–5E, exemplary timing diagrams show the relationship between various signals of system 100. FIG. 5A shows an idealized back EMF waveform for winding 310 of motor 104 and indicates zero crossings at reference character ZC. As described above, control circuit 122 generates motor control signals as a function of the position of rotor 110 which may be determined as a function of the zero crossings of the back EMF. Also, the polarity of the back EMF is such that it causes circulating currents in motor 104 to decay during normal operation of motor 104. FIG. 5B illustrates commutation signals generated by control circuit 122 for causing commutation in motor 104. The upper signal of FIG. 5B is used for enabling switch 212A and switch 214B and the lower signal of FIG. 5B is used for enabling switch 212B and switch 214A. FIG. 5C illustrates motoring current $I_M$ which energizes winding 310 during operation of motor 104. According to the present invention, control circuit 122 regulates current in winding 310 as a function of the peak regulated current level by turning off and on the power supplied to winding 310. As shown in FIG. 5C, this causes the current $I_M$ to decay from its peak value. The commanded current is indicated in FIG. 5C as $I^*_{REF}$. As described above, the commanded current in motor 104 is a function of the peak regulated current level as represented by the signal IREF. FIG. 5D illustrates the signals $f_{PWM}$ and PWM as described with respect to FIG. 4 and FIG. 5E illustrates the conducting and nonconducting states of power switches 132 as they relate to the other signals.

The timing diagram FIGS. 5A–5E identify four different states in the operation of the single phase winding 310 driven by the H-bridge inverter 210. A first state, indicated at reference character 502, occurs when motor 104 is connected directly to the source voltage from power supply 134 (shown in FIG. 3A). A second state, indicated at reference character 504, occurs when motor current $I_M$ decays while circulating in a loop set by one switch (i.e., switch 212A) and one diode (i.e., diode 216B) (shown in FIG. 3B). A third state, indicated at reference character 506, occurs when motor current $I_M$ decays via freewheeling diodes (i.e., diode 216B and diode 218A) (shown in FIG. 3C). In this instance, the actual voltage across motor winding 310 is the supply voltage plus the back EMF. A fourth state occurs at the commutation instances, indicated at reference character 508, when all of power switches 132 are off. It is to be understood that immediately after commutation, the enabled power switches (e.g., switches 212B, 214A) are actually commanded "on", but the decay of the inductive current through the corresponding freewheeling diodes (e.g., diodes 216B, 218A) keep the switches in the "off" state until current reaches zero. Consequently, the enabled power switches become active when current reverses its polarity. In one embodiment, switches 132 may be commanded "off" for a short interval after each commutation and turned "on" after motor current has decayed and the back EMF is crossing zero.

FIGS. 6A–6D are exemplary timing diagrams illustrating the relationship between the currents in motor 104 and current regulation for normal and abnormal operation of motor 104 according to the commutation strategy of FIGS. 5A–5E. FIG. 6A illustrates the switching states of PWM switches 214B and 214A. As described above, the digital signal CURREG represents the output of comparator U1A, i.e., the current regulation comparator. The low level of CURREG indicates that the motor current $I_M$, as represented by the current $I_{SHUNT}$ in shunt resistor $R_{SHUNT}$, has exceeded the peak regulated current level commanded by IREF. At the end of the pulse width modulating cycle, a new PWM cycle is initiated. It is to be understood that the modulation scheme may be of constant frequency, constant "off time", random frequency, or pseudo-random frequency. For example, a preferred embodiment of the invention driving laundry machine 102 uses a constant "off time" modulation scheme for regulating current.

FIG. 6B shows the motor current $I_M$ regulated at the peak regulated current level commanded by IREF. Again, the commanded current is indicated in FIG. 6B as $I^*_{REF}$. As described above, the commanded current in motor 104 is a function of the peak regulated current level as represented by the signal IREF.

FIG. 6C shows the idealized back EMF waveform for winding 310 of motor 104. The polarity of the back EMF is such that it causes circulating currents in motor 104 to decay during normal operation of motor 104. As indicated in FIG. 6C at reference character 602, the back EMF is positive during normal operation when switch 212A is conducting and switch 214B is being pulse width modulated. Conversely, as indicated at reference character 604, the back EMF is negative when switch 212B is conducting and switch 214A is being pulse width modulated.

FIG. 6D shows sections of the current observed at shunt resistor $R_{SHUNT}$. The positive pulses (e.g., as indicated at reference characters 606, 608) of $I_{SHUNT}$ represent the current from the supply voltage applied to motor winding 310. After a commutation 508, the inductive current stored in winding 310 is returned to supply 134. As described above, circulating currents exist when one power switching device (e.g., switch 212A or switch 212B) is conducting at its corresponding pulse width modulated power switching device (e.g., switch 214B or switch 214A) is not conducting. During normal operation of motor 104, the polarity of the back EMF is such that the circulating currents must decay from the maximum value set by the current reference IREF. Thus, monitoring at this time is not necessary. FIG. 6C also illustrates in phantom at reference characters 610, 612 the decaying circulating currents during two exemplary PWM off intervals. The negative current in FIG. 6D, shown at reference character 614, for example, shows the motor current $I_M$ decaying to zero and inductive motor current in the opposite direction when all four switches of power switches 132 are off at the commutation instances 508. FIG. 6D also shows a minimum interval 616, for example, that switches 132 are commanded on at the beginning of each PWM cycle. This time interval is long enough to permit circulating currents to transfer to shunt resistor $R_{SHUNT}$. This time interval is short enough, however, that it will not significantly affect current regulation in motor 104. For example, the minimum on time is approximately 5 microseconds. Thus, current regulation will not be affected unless the duty cycle is very close to 0%. The minimum on interval is selected as a function of the power capacity of power switches 132 and the current regulation strategy for the particular application in which system 100 is to be used.

FIGS. 6A–6D also illustrate the relationship between the currents in motor 104 and current regulation for abnormal operation of motor 104 according to the commutation strategy of FIGS. 5A–5E. As described above, a loss of position, or loss of synchronism between the rotor position feedback and the motor back EMF, results in undesirable circulating currents in motor 104. In this instance, the polarity of the back EMF is such that the net voltage applied to motor 104 is the supply voltage plus the back EMF (in FIGS. 3A–3D, the polarity indicated is reversed when switches 212A and 214B are enabled). Due to the polarity of the back EMF, the motor current $I_M$ builds up faster than in normal operation. For example, out of position commutation occurs at the time indicated by reference character 618. Once $I_M$ reaches the peak regulating level $I^*_{REF}$ at reference character 620, the current regulation signal CURREG from comparator U1A turns off the PWM switch (e.g., switch 214A). With the PWM switch off, a circulating current path is established. The driving force for this circulating current is the back EMF. In contrast to normal operation, the back EMF in this instance now favors the current increase. Because the enabled switches (e.g., switches 212B, 214A) are both conducting for the minimum interval 616, the current in motor 104 is diverted to shunt resistor $R_{SHUNT}$ during the interval.

After the current $I_{SHUNT}$ reaches the maximum commanded current level $I^*_{MAX}$, which is a function of the maximum current level as represented by the signal ITRIP, the digital signal OCTRIP representing the output of comparator U1B, i.e., the overcurrent comparator, goes low. The low level of OCTRIP indicates that the motor current $I_M$, as represented by the current $I_{SHUNT}$ in shunt resistor $R_{SHUNT}$, has exceeded the maximum current level. In a preferred embodiment of the invention, control circuit 122 recognizes a low level OCTRIP signal as indicating that motor current is in excess of the maximum current level permitted for the particular motor 104 and inverter 210. In response, control circuit 122 causes all power switches 132 to be turned off or initiates some other protective action. By turning off all of power switches 132, current is returned to power supply 134 via the freewheeling diodes (e.g., diodes 218B, 216A). In contrast to conventional systems, system 100 achieves protection by turning off all of power switches 132 rather than just one as would be the response for normal PWM operation. In this manner, system 100 reduces and controls abnormal circulating currents.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A single phase motor comprising:
   a stationary assembly including a winding;
   a rotatable assembly in magnetic coupling relation to the stationary assembly;
   a power supply link for supplying power from a power supply to the winding, said power supply link including power switches responsive to a motor control signal for selectively connecting the winding to the power supply in alternating on and off intervals to produce an electromagnetic field for rotating the rotatable assembly;
   a current sensing circuit sensing current in the power supply link during the on intervals of the power supplied to the winding;
   a current regulation circuit generating a current regulation signal representative of the difference between the sensed current in the power supply link and a peak regulated current level, said peak regulated current level being a function of a desired speed and/or torque of the motor;
   an overcurrent circuit generating an overcurrent signal in response to the sensed current in the power supply link exceeding a maximum current level greater than the peak regulated current level; and
   a control circuit responsive to the current regulation signal for generating the motor control signal as a function of the current regulation signal thereby to regulate current in the winding and control the speed and/or torque of the motor in response to the current regulation signal and as a function of the desired speed and/or torque, at least one of the on intervals of the power supplied to the winding in response to the motor control signal being greater than or equal to a minimum interval which is independent of the current regulation signal, and said control circuit responsive to the overcurrent signal for causing the power switches to disconnect the winding from the power supply thereby to prevent excessive current from circulating in the motor.

2. The motor of claim 1 wherein the current regulation circuit comprises a first current comparator circuit comparing the sensed current in the power supply link to the peak regulated current level, said first comparator circuit generating the current regulation signal when the sensed current exceeds the peak regulated current level during the on intervals of the power supplied to the winding.

3. The motor of claim 1 wherein the overcurrent circuit comprises a second current comparator circuit comparing the sensed current to the maximum current level, said second comparator circuit generating the overcurrent signal when the sensed current exceeds the maximum current level during the on intervals of the power supplied to the winding.

4. The motor of claim 1 wherein the power switches of the power supply link comprise an inverter bridge having a positive rail and a negative rail supplied by the power supply and wherein the current sensing circuit comprises a shunt resistor in one of the rails of the inverter bridge.

5. The motor of claim 4 wherein the power switches are responsive to the overcurrent signal to become nonconducting independent of the current regulation signal when the sensed current exceeds the maximum current level whereby current circulating in the inverter bridge and the winding during intervals when only one of the power switches is conducting is forced to decay.

6. The motor of claim 4 wherein the power switches are responsive to the motor control signal to pulse width modulate the power supplied to the winding from the power supply at a duty cycle which is a function of the current regulation signal, and wherein the minimum interval is independent of the duty cycle and current circulating in the inverter bridge and the winding is forced through the shunt resistor during the on intervals of the power supplied to the winding.

7. The motor of claim 1 wherein the control circuit is responsive to the overcurrent signal for generating the motor control signal independent of the current regulation signal thereby causing the power switches to become nonconducting to prevent power from being supplied to the winding from the power supply when the sensed current in the power supply link exceeds the maximum current level.

8. The motor of claim 1 wherein the control circuit includes a processor for determining the peak regulated current level as a function of the desired speed and/or torque of the motor.

9. The motor of claim 1 further comprising a shaft in driving relation with the rotatable assembly for driving a rotatable component of a laundering apparatus.

10. A system for driving a rotatable component of a laundering apparatus comprising:
   a single phase motor having a stationary assembly and a rotatable assembly in magnetic coupling relation to the stationary assembly, said stationary assembly including a winding, said rotatable assembly being in driving relation to the rotatable component;

a power supply link for supplying power from a power supply to the winding, said power supply link including power switches responsive to a motor control signal for selectively connecting the winding to the power supply in alternating on and off intervals to produce an electromagnetic field for rotating the rotatable assembly;

a current sensing circuit sensing current in the power supply link during the on intervals of the power supplied to the winding;

a current regulation circuit generating a current regulation signal representative of the difference between the sensed current in the power supply link and a peak regulated current level, said peak regulated current level being a function of a desired speed and/or torque of the motor;

an overcurrent circuit generating an overcurrent signal in response to the sensed current in the power supply link exceeding a maximum current level greater than the peak regulated current level; and a control circuit responsive to the current regulation signal for generating the motor control signal as a function of the current regulation signal thereby to regulate current in the winding and control the speed and/or torque of the motor in response to the current regulation signal and as a function of the desired speed and/or torque, at least one of the on intervals of the power supplied to the winding in response to the motor control signal being greater than or equal to a minimum interval which is independent of the current regulation signal, and said control circuit responsive to the overcurrent signal for causing the power switches to disconnect the winding from the power supply thereby to prevent excessive current from circulating in the motor and the power switches.

11. A protective circuit for a single phase motor, said motor having a stationary assembly including a winding and a rotatable assembly in magnetic coupling relation to the stationary assembly, said motor also having a control circuit for generating a motor control signal and a power supply link for supplying power from a power supply to the winding, said power supply link including power switches responsive to the motor control signal for selectively connecting the winding to the power supply in alternating on and off intervals to produce an electromagnetic field for rotating the rotatable assembly, said protective circuit comprising:

a current sensing circuit sensing current in the power supply link during the on intervals of the power supplied to the winding;

a first current comparator circuit comparing the sensed current in the power supply link to a peak regulated current level and generating a current regulation signal representative of the difference between the sensed current and the peak regulated current level, said peak regulated current level being a function of a desired speed and/or torque of the motor, said control circuit being responsive to the current regulation signal for generating the motor control signal as a function of the current regulation signal thereby to regulate current in the winding and control the speed and/or torque of the motor in response to the current regulation signal and as a function of the desired speed and/or torque; and a second current comparator circuit comparing the sensed current in the power supply link to a maximum current level greater than the peak regulated current level and generating an overcurrent signal when the sensed current exceeds the maximum current level during the on intervals of the power supplied to the winding, at least one of the on intervals being greater than or equal to a minimum interval which is independent of the current regulation signal, said control circuit being responsive to the overcurrent signal for causing the power switches to disconnect the winding from the power supply thereby to prevent excessive current from circulating in the motor.

12. A method of operating a single phase motor, said motor having a stationary assembly including a winding and a rotatable assembly in magnetic coupling relation to the stationary assembly, said motor also having a power supply link including power switches for supplying power from a power supply to the winding, said method comprising the steps of:

selectively connecting the winding to the power supply in alternating on and off intervals with the power switches in response to a motor control signal to produce an electromagnetic field for rotating the rotatable assembly;

sensing current in the power supply link during the on intervals of the power supplied to the winding;

generating a current regulation signal representative of the difference between the sensed current in the power supply link and a peak regulated current level, said peak regulated current level being a function of a desired speed and/or torque of the motor;

generating an overcurrent signal in response to the sensed current in the power supply link exceeding a maximum current level greater than the peak regulated current level;

generating the motor control signal in response to the current regulation signal thereby to regulate current in the winding and control the speed and/or torque of the motor as a function of the current regulation signal and as a function of the desired speed and/or torque, at least one of the on intervals of the power supplied to the winding in response to the motor control signal being greater than or equal to a minimum interval which is independent of the current regulation signal; and generating the motor control signal in response to the overcurrent signal for causing the power switches to disconnect the winding from the power supply thereby to prevent excessive current from circulating in the motor.

13. The method of claim 12 further comprising the step of comparing the sensed current in the power supply link to the peak regulated current level and wherein the step of generating the current regulation signal comprises generating the current regulation signal when the sensed current exceeds the peak regulated current level during the on intervals of the power supplied to the winding.

14. The method of claim 12 further comprising the step of comparing the sensed current to the maximum current level and wherein the step of generating the overcurrent signal comprises generating the overcurrent signal when the sensed current exceeds the maximum current level during the on intervals of the power supplied to the winding.

15. The method of claim 12 wherein the power switches of the power supply link comprise an inverter bridge having a positive rail and a negative rail supplied by the power supply and wherein the current sensing step comprises sensing current in one of the rails of the inverter bridge with a shunt resistor.

16. The method of claim 15 further comprising the step of causing the power switches to become nonconducting in response to the overcurrent signal and independent of the current regulation signal when the sensed current exceeds the maximum current level whereby current circulating in the inverter bridge and the winding during intervals when only one of the power switches is conducting is forced to decay.

17. The method of claim 15 further comprising the step of pulse width modulating the power supplied to the winding from the power supply at a duty cycle which is a function of the current regulation signal, and wherein the minimum interval is independent of the duty cycle and current circulating in the inverter bridge and the winding is forced through the shunt resistor during the on intervals of the power supplied to the winding.

18. The method of claim 12 wherein the step of generating the motor control signal comprises generating the motor control signal in response to the overcurrent signal and independent of the current regulation signal whereby the power switches become nonconducting to prevent power from being supplied to the winding from the power supply when the sensed current in the power supply link exceeds the maximum current level.

19. The method of claim 12 further comprising the step of determining the peak regulated current level as a function of the desired speed and/or torque of the motor.

20. The method of claim 12 wherein the motor includes a shaft in driving relation with the rotatable assembly and further comprising the step of driving a rotatable component of a laundering apparatus with the shaft.

21. A method of operating a system for driving a rotatable component of a laundering apparatus, said system including a single phase motor having a stationary assembly and a rotatable assembly in magnetic coupling relation to the stationary assembly, said stationary assembly including a winding, said rotatable assembly being in driving relation to the rotatable component, said motor also having a power supply link including power switches for supplying power from a power supply to the winding, said method comprising the steps of:

selectively connecting the winding to the power supply in alternating on and off intervals with the power switches in response to a motor control signal to produce an electromagnetic field for rotating the rotatable assembly;

sensing current in the power supply link during the on intervals of the power supplied to the winding;

generating a current regulation signal representative of the difference between the sensed current in the power supply link and a peak regulated current level, said peak regulated current level being a function of a desired speed and/or torque of the motor;

generating an overcurrent signal in response to the sensed current in the power supply link exceeding a maximum current level greater than the peak regulated current level;

generating the motor control signal in response to the current regulation signal thereby to regulate current in the winding and control the speed and/or torque of the motor as a function of the current regulation signal and as a function of the desired speed and/or torque, at least one of the on intervals of the power supplied to the winding in response to the motor control signal being greater than or equal to a minimum interval which is independent of the current regulation signal; and generating the motor control signal in response to the overcurrent signal for causing the power switches to disconnect the winding from the power supply thereby to prevent excessive current from circulating in the motor.

22. A method of protecting a single phase motor from excessive currents circulating in the motor, said motor having a stationary assembly including a winding and a rotatable assembly in magnetic coupling relation to the stationary assembly, said motor also having a control circuit for generating a motor control signal and a power supply link for supplying power from a power supply to the winding, said power supply link including power switches responsive to the motor control signal for selectively connecting the winding to the power supply in alternating on and off intervals to produce an electromagnetic field for rotating the rotatable assembly, said method comprising the steps of:

sensing current in the power supply link during the on intervals of the power supplied to the winding;

comparing the sensed current in the power supply link to a peak regulated current level, said peak regulated current level being a function of a desired speed and/or torque of the motor;

generating a current regulation signal representative of the difference between the sensed current and the peak regulated current level, said control circuit being responsive to the current regulation signal for generating the motor control signal as a function of the current regulation signal thereby to regulate current in the winding and control the speed and/or torque of the motor in response to the current regulation signal and as a function of the desired speed and/or torque;

defining a minimum interval independent of the current regulation signal during which the winding is connected to the power supply, at least one of the on intervals of the power supplied to the winding in response to the motor control signal being greater than or equal to the minimum interval;

comparing the sensed current in the power supply link to a maximum current level greater than the peak regulated current level;

generating an overcurrent signal when the sensed current exceeds the maximum current level; and causing the power switches to disconnect the winding from the power supply in response to the overcurrent signal thereby to prevent excessive current from circulating in the motor.

* * * * *